United States Patent Office 3,044,495
Patented July 17, 1962

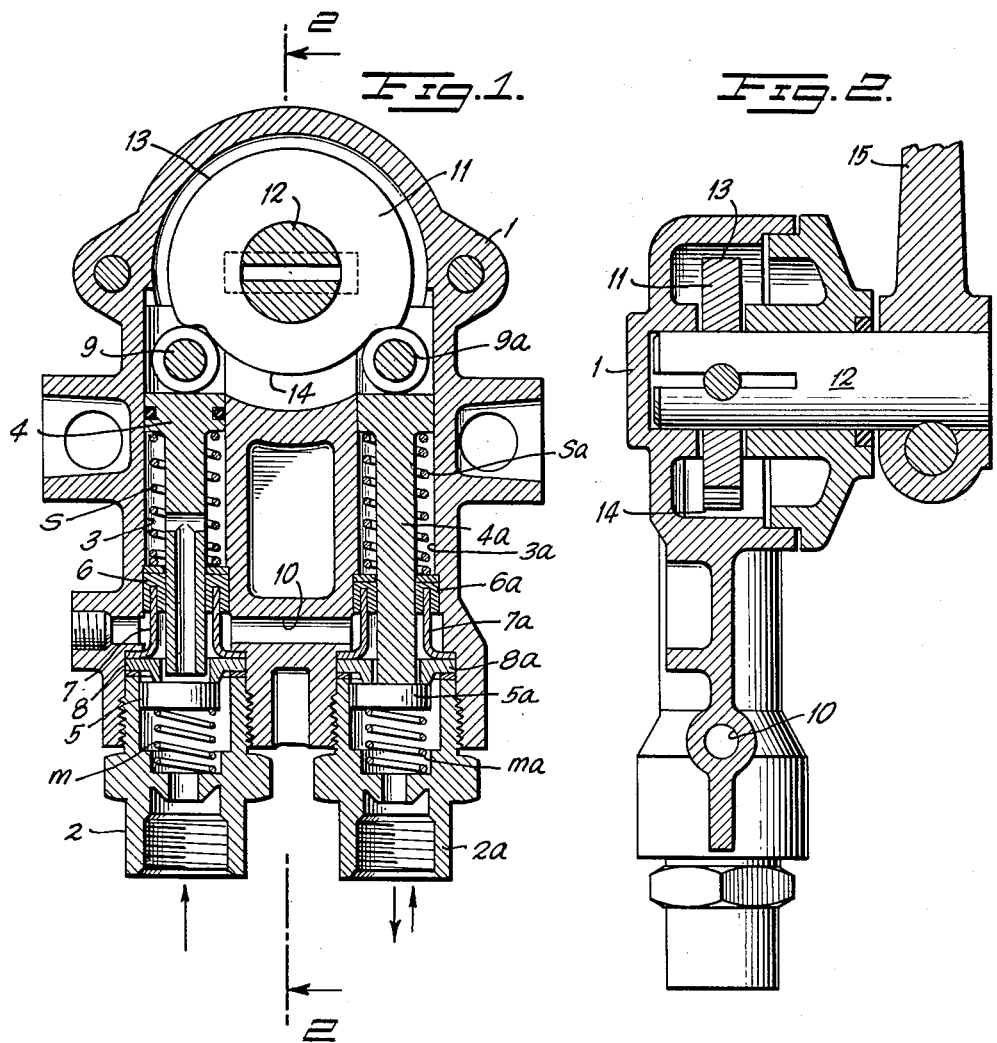
INVENTOR
*Giuseppe Alfieri*
BY *Harold T. Stowell*
*Harold L. Stowell*
ATTORNEYS

3,044,495
LOAD LEVELLING DEVICE FOR A PNEUMATIC SUSPENSION, PARTICULARLY FOR A MOTOR VEHICLE
Giuseppe Alfieri, Milan, Italy, assignor to Fabbrica Italiana Magneti Marelli S.p.A., Milan, Italy, a firm
Filed May 14, 1959, Ser. No. 813,086
1 Claim. (Cl. 137—636.1)

This invention generally relates to a load levelling device for a pneumatic suspension system for a motor vehicle and more particularly to a valve structure providing communication between a source of the pressure fluid and a load.

As it is well known, there are systems for carrying out air feeding and blowing off of the pneumatic springs of the system upon an increase or diminution of an associated load.

When such systems are used on motor vehicles, an outside driving lever is connected at its free end to the wheel axle and at its other end to the driving members of the levelling device that is fitted to the vehicle frame.

The resilient members are arranged between the wheel axle and the frame. It results therefrom that in the operation of the device at each load alteration on the vehicle a corresponding angular deflection of the above mentioned lever takes place, with consequent operation of the members connected to the lever and therefore of the levelling device. Such action will cause air feeding or blowing off of pneumatic springs to thereby establish the predetermined original level condition of the vehicle frame.

It is an object of the present invention to provide a levelling device with a push rod driving member, that is particularly simple and rigid so as to allow a remarkable sensibility and operation safety and moreover the largest possible rotation of the outside driving lever.

The device according to the invention is characterized in that the driving or control member of the push rods for opening the inlet and blowing off valves is constituted by a cam, whose peripheral development corresponds in part to the working outline and for the remainder to the inactive outline. The cam is arranged on the rotatable shaft operated by an outside lever and may be rotated through 360° without damaging any of the mechanism.

The attached drawing shows a preferred embodiment of the present invention.

In the drawing:

FIG. 1 is a longitudinal section of the device through the push rod axis and associated cam; and FIG. 2 is a cross section along line A—A of FIG. 1.

Referring to the drawing it will be seen that the device is constituted substantially of a body or housing 1, having two driving sections each of which is provided with a fitting connection 2 and 2a, that provide communication of the left or feeding section to an associated air tank, and of the right or outlet section to an associated pneumatic spring or suspension bellows, respectively.

The left section is provided with a cylinder 3, a push rod 4, and an inlet valve 5.

A tight sliding motion of the push rod 4 in the cylinder 3 takes place owing to a gasket 6, which is held in its place by means of a spacing member 7 secured to a ring 8, whereon the valve 5 is seated. The push rod 4 is drilled on the lower end to allow blowing off into the free atmosphere of the air as coming out of the bellows which is in communication with the fitting 2a. On the other end, that is on the acting end, the push rod 4 is provided with an end roller 9.

The fitting connection 2 is secured to body 1 in the direction of cylinder 3 and has a shoulder, where a spring $m$ abuts acting against the inlet valve 5 to normally maintain the same in a closed position.

The air flow from an associated pressure source, not shown, to the cylinder 3 takes place only when the inlet valve 5 is disengaged from its seat under the action of push rod 4.

It will be noted that a spring S is provided to return the push rod 4 to its original position after being depressed by the action of the associated mechanism, as explained in greater detail hereinafter.

The right section of the device is similar to the left one and the same members thereof have the same reference numbers but with index $a$. There is however a difference between push rod 4 and push rod 4a, that is the latter does not show any hole inside thereof as in the case of push rod 4. Moreover, the operation of two sections is different, particularly as to the valve 5a, that operates in the outlet phase.

The communication between the two sections takes place by means of a passage 10, through which a direct connection between the annular spaces of the cylinders 3 and 3a on the valve side is obtained.

According to the invention, the driving member of push rods 4 or 4a is constituted by a cam 11, which is secured to the inside end of rotatable shaft 12. The cam 11 has two cylindrical outlines, the larger one of which is indicated at 13 forms the operation or working outline which acts with a downwardly directed push upon roller 9 or 9a. The other outline 14 is depressed relative to the first one.

In FIGURE 1 the device is shown in rest position with both end rollers of push rods 4, 4a abutting on the depressed cam outline 14.

Closing the valve 5a through the spring $ma$, and opening the inlet valve 5 through push rod 4 is caused by a counter-clockwise rotation of driving shaft 12 and therefore of the cam 11; whereas opening of the bellows blowing off valve 5a and closing of the inlet valve 5 takes place during a clockwise rotation of shaft 12.

Therefore, when the system is required to supply air to the pneumatic spring or suspension bellows, the push rod 4 is depressed to open the valve 5 allowing pressure fluid to pass through the passage 10 opening the valve 5A to direct the pressure fluid to the load through the fitting 2a. Conversely, when it is required to bleed or exhaust fluid from the associated pr.umatic spring or suspension bellows, the push rod 4a is depressed opening the valve 5a allowing the fluid to pass through the fitting 2a, the passage 10, the axial bore of the push rod 4, and to the atmosphere through a port in the housing 1, not shown.

Such rotational movements are caused, as it is well known, by lowering and lifting of the vehicle suspended part relative to the unsuspended part thereof (wheel-axle) and are transmitted by means of the outside operation lever 15 secured to the shaft 12.

It will be appreciated that the control lever 15 may be rotated through 360° without altering the operative working condition of the valve assembly. This feature is particularly advantageous under circumstances where an associated vehicle chassis must be raised from its normal position. In this event, the control lever 15 must rotate through a considerably larger arc and since the cam may assume such movement without breaking or blocking the device, the associated vehicle may be easily raised without the necessity of disconnecting associated linkages interconnecting the tie rod assembly which connects the control lever to that portion of the vehicle not suspended.

I claim:

A valve for use in a control mechanism for a motor vehicle pressure fluid suspension system having a source of fluid pressure and a fluid pressure actuated load and adapted to be mounted between the pressure source and the spring, said valve device comprising a housing having first and second spaced substantially parallel chambers, said first chamber adapted to communicate with the source of pressure fluid, said second chamber adapted to communicate with the fluid pressure actuated load, passage means interconnecting said first and second chambers, normally closed spring urged flow control means at the lower end of each of said chambers, said flow control means in said first chamber normally blocking pressure fluid from the source, said flow control means in said second chamber normally blocking communication between the load and said passage means, a push rod reciprocatively mounted in each of said chambers with the lower end of said rods engaging its respective spring urged flow control means, the first chamber having port means for effecting communication between said passage and the atmosphere, separate means for normally maintaining said push rods in a predetermined position, a cam follower at the upper end of each of said push rods, and a rotatable plate means having a pair of radial cam lobes for selectively causing said push rods to urge their respective spring urged flow control means to an open position, whereby pressure fluid from the source may be directed to the fluid pressure actuated load upon a downward movement of said push rod in said first chamber and pressure fluid may be directed from the fluid pressure actuated load upon a downward movement of said push rod in said second chamber.

References Cited in the file of this patent

UNITED STATES PATENTS

| | | |
|---|---|---|
| 1,887,606 | Thomas | Nov. 15, 1932 |
| 2,132,766 | Stroup | Oct. 11, 1938 |
| 2,670,201 | Rossman | Feb. 23, 1954 |
| 2,942,623 | Schwartz | June 28, 1960 |
| 2,964,311 | Stelzer | Dec. 13, 1960 |

FOREIGN PATENTS

| | | |
|---|---|---|
| 1,190,420 | France | Mar. 31, 1959 |